United States Patent [19]

Cope et al.

[11] Patent Number: 5,646,624

[45] Date of Patent: Jul. 8, 1997

[54] PERFORMANCE MATCHING OF WEATHER AVOIDANCE RADAR

[75] Inventors: Warren Bruce Cope, Olathe; Mark G. Roos, Shawnee, both of Kans.

[73] Assignee: AlliedSignal, Inc., Morristown, N.J.

[21] Appl. No.: 428,741

[22] Filed: Apr. 25, 1995

[51] Int. Cl.⁶ .................................................. G01S 7/40
[52] U.S. Cl. ............................................................ 342/174
[58] Field of Search ............................................... 342/174

[56] References Cited

U.S. PATENT DOCUMENTS

| | | | |
|---|---|---|---|
| 4,058,810 | 11/1977 | Bryden | 342/174 |
| 4,268,828 | 5/1981 | Cribbs et al. | 342/26 |
| 4,517,161 | 5/1985 | Gravina et al. | 422/95 |
| 5,221,928 | 6/1993 | Dahl | 342/205 |
| 5,293,325 | 3/1994 | Roos | 364/571.01 |
| 5,541,608 | 7/1996 | Murphy et al. | 342/442 |

*Primary Examiner*—John B. Sotomayor

[57] ABSTRACT

The invention of this patent is related to unit-to-unit performance matched radar provided by automatic compensation based on software mapping of calibration data over an dynamic operating range of temperature and radar return signals.

18 Claims, 2 Drawing Sheets

PERFORMANCE MATCHING OF WEATHER AVOIDANCE RADAR

BACKGROUND OF THE INVENTION

1. Field of the Invention

The present invention relates to weather radar and more particularly to the elimination of variations in the performance of radars caused by temperature changes or by the replacement of the original radar with a substitute radar.

2. Description of the Prior Art

An airborne weather radar is periodically removed from an aircraft and replaced. The replacement radar functions somewhat differently than the original radar and therefore the pilot is faced with a new radar display pattern. This causes confusion as well as a lack of confidence in the radar's ability to perform. Also, an existing radar display pattern varies over temperature. Temperature variations include, for example, changes in the ambient temperature of the radar unit and changes of the component temperatures during operation. This also causes confusion and lack of confidence for the pilot.

Existing radar units have no ability to match unit to unit performance. The technical reason is component variations and tolerances. Operational responses of these components also vary over temperature.

It is an object of the present invention to eliminate the problem of unit to unit variation and operation over temperature for weather radar presentation.

SUMMARY OF THE INVENTION

The present invention allows for the transparent replacement of radar units and for consistent radar presentation over changing ambient temperatures. The present invention comprises a system having the capability to selectively calibrate each radar, therefore providing substantially identical performance output. This calibration is possible because the calibration system digitally stores the power/response for all functional parameters of weather. Operational changes are digitally stored over all operational temperatures. This includes sensitivity mapping, gain mapping, and color threshold mapping for each unit. Each unit stores these values and modifies each radar response to a common display presentation. As a result, uniform output displays are presented to the pilot or other user even with temperature variations. This is accomplished while significantly reducing the number and amount of temperature compensating circuitry in the radar unit itself, thereby simplifying overall circuitry. This leads to far simpler, more economical and more reliable radar circuitry.

DETAILED DESCRIPTION OF THE INVENTION

The present invention comprises a system that eliminates variations in the performance of radars caused by temperature changes or by the replacement of the original radar with a substitute radar. This invention uses software mapping of the temperature and weather radar parameters to tune each radar for identical performance.

This is achieved by calibrating each radar by stimulation of the receiver with the full operating dynamic range of temperature and weather return signals.

Weather returns (based on received power) spaced uniformly are presented to the radar receiver and stored as a sensitivity mapping. The invention then changes the gain of the receiver to map receiver gains for each sensitivity level. The color thresholds for each combination of receiver sensitivity and gain are mapped.

These maps are used to determine the correct color threshold given any received combination of intervening weather, receiver sensitivity and gain non-linearity's The ability to map and recall all combinations of changes in gain (required during STC and extended STC) and receiver sensitivity allow all radar's to be identical in performance. This occurs over the entire operational temperature zone.

Figure 1:
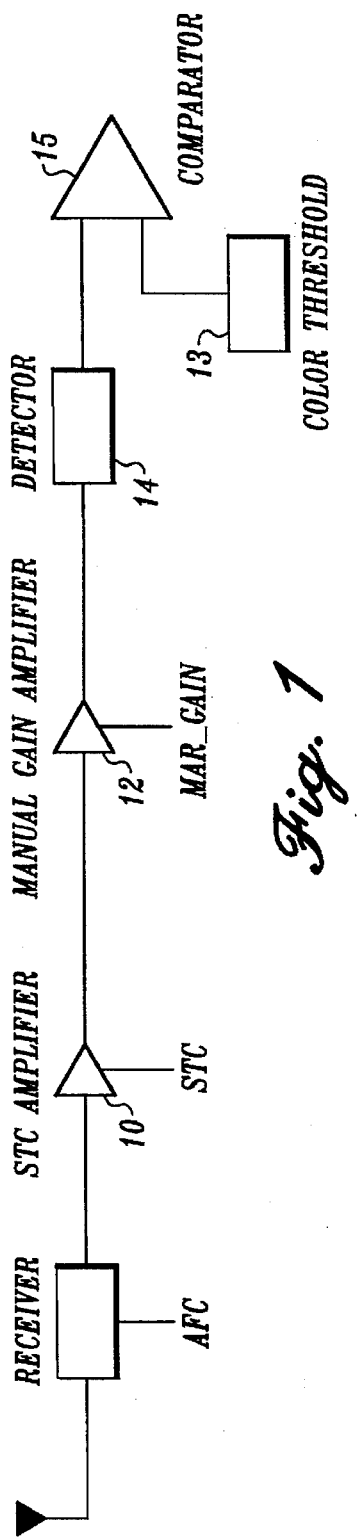
FIG. 1 is an overall schematic diagram of the receiver section of a radar unit.

More particularly, FIG. 1 illustrates the basic elements in the receiver section of a radar unit. While the unit described is a weather avoidance radar for use with general aviation aircraft, the principles of the present invention are applicable to other radar. The incoming signal from a receiver with automatic frequency control passes first to a sensitivity time coefficient (STC) amplifier 10, then to a manual gain amplifier 12 before being directed into the detector portion 14 of the radar. Amplifiers 10 and 12 together represent an amplifier section. The output from detector 14 and a color threshold input 13 are received in comparator 15 whose output is sensitivity, gain, and color-threshold calibrated for the desired, performance matched output. Generally, the present invention operates to automatically adjust the gains of amplifiers 10 and 12 and the color threshold 13 in relation to a pre-calibrated regime to compensate for dynamic variations in the radar unit components and for variations in temperature.

Figure 2:
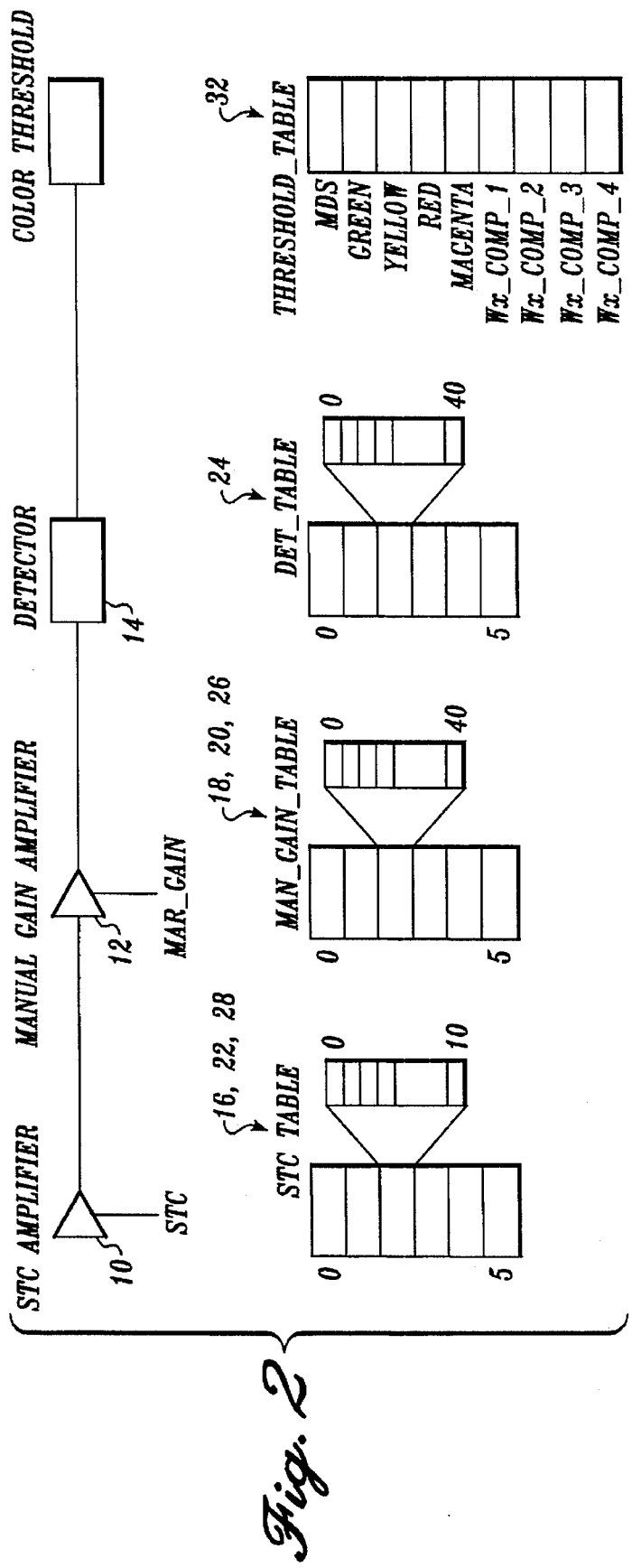
FIG. 2 is a flow diagram of the operational logic of calibration of the receiver section of a radar unit as contemplated by the present invention.

Calibration occurs in the following manner through software. The basic flow logic of the calibration software is described with respect to FIG. 2.

1. The following steps are repeated for the entire operating temperature range in inform, incremental temperature steps.

1.1. Determine the temperature being calibrated and record.

1.2 Set an incoming power level test signal to be less than the minimum operating signal strength to be expected during operation.

1.3 Fix the noise floor of the receiver to a nominal value. The gains of the STC 10 and Manual Gain 12 amplifiers are balanced to equally share the amplification while maintaining a fixed voltage output to the detector 14.

1.4 Record the STC and Manual Gain amplification settings into their corresponding tables 16, 18 for the particular temperature.

2.0 The following steps are repeated for the entire dynamic range of the weather return signals in uniform incremental steps of received input power level from the test signal ( e.g.,−115 dBm, −114 dBm, −75 dBm).

2.1 Increment and record the signal power level.

2.2 Fix the STC amplifier 10 to the value recorded in step 1.4. Change the amplification setting of the Manual Gain amplifier 12 to remove the increase in the voltage output. This new setting represents the equivalent amplification setting change for a fixed power change. Record the Manual Gain map 20 for this signal power level.

2.3 Fix the Manual Gain amplifier 12 to the value recorded in step 1.4. Change the amplification setting of the STC amplifier 10 to remove the increase in the voltage output. This new setting represents the equivalent amplification setting change for a fixed power change. Record the STC gain map 22 for this signal power level.

2.4 Fix the STC and Manual Gain amplifiers 10 and 12 to the value recorded in step 1.4. Measure the detected voltage and record in the detector map 24 for this signal power level.

3.0 Remove all input signals to the receiver section.

3.1 Vary the amplification of the STC and Manual Gain amplifiers 10, 12 to produce a set value at the output of the detector 14. The amplification is determined by utilization of the mapping tables 16, 18, 20, 22, 24. The mapping curves provide fixed gain settings for known power levels. Record these settings as Nominal Manual Gain 26 and Nominal STC 28.

4.0 Apply the Minimum Discernible Signal (MDS) as input power to the receiver section.

4.1 Save the Detector 14 voltage output as the MDS threshold.

5.0 Search through the detector mapping 24 to determine the MDS index 32 for this power level. Traverse the table relative to this index to determine the thresholds for target presentations 34. Typically for weather radar, presentation parameters include sensitivity, gain and color. For example, traverse the equivalent of 10 dB from the MDS index 32 to determine the next weather color level detector value. The color mapping defines a constant operational performance over individual unit variations and over temperature.

6.0. Traverse the table relative to the MDS index 32 to determine the thresholds for weather compensation. The compensation mapping defines a constant operational performance over individual unit variations and over temperature.

7.0 Store all mapping values into permanent storage resident with each unit.

Figure 3:
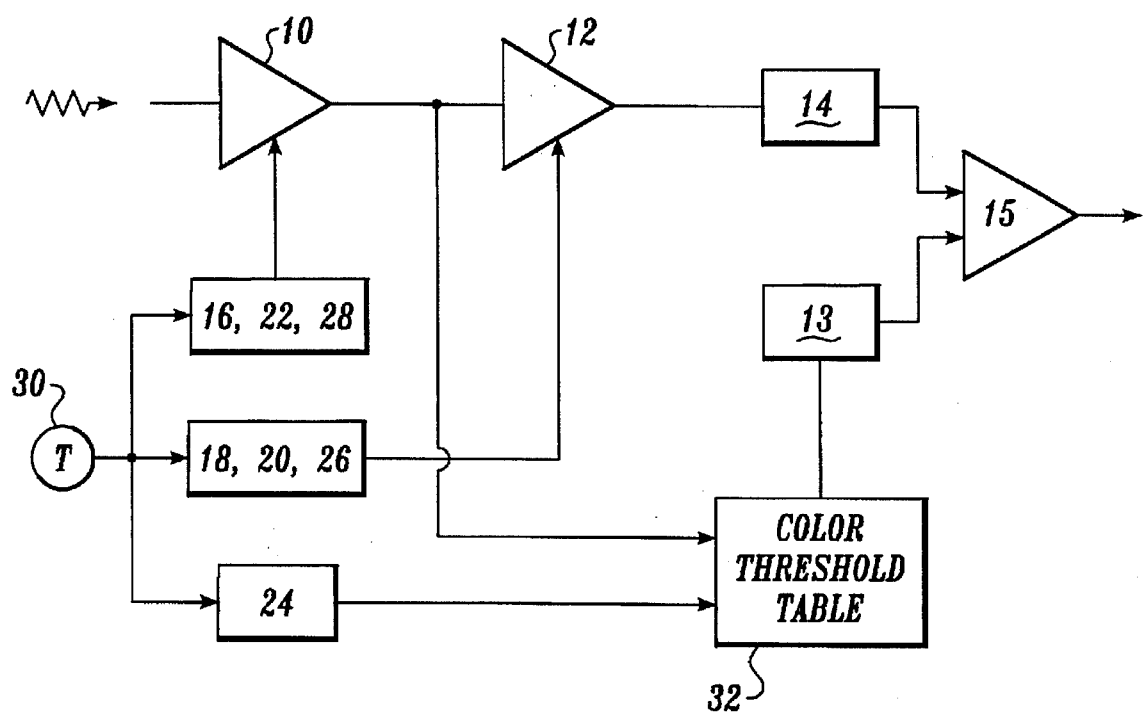
FIG. 3 is a flow diagram of the operation of the present invention during typical operation.

Referring to FIG. 3, the software flow during run time operation of the performance matched radar unit of the present invention is described as follows for a magnetron-based weather radar.

1. Determine the operating temperature from temperature sensor 30. If temperature zones are used then interpolate the following parameters between the zones.
2. Retrieve this temperature from the STC table 16 and set the STC amplifier.
3. Retrieve this temperature from the Manual Gain entry 10 and set Manual Gain amplifier.
4. Retrieve this temperature from the Detector table 24 and extract the color thresholds. Store these values in a table for later use.
5. Fire the magnetron and enable the receiver. During reception, step the STC amplifier 10 through the entries in the STC table 16.
6. After data is collected from Step 5, the digitized data from the stored data in Step 4 and the Step 5 are quantized based upon the thresholds determined in the Threshold table 32. The output of threshold 13 may thus be considered a compensating signal to comparator 15.

It is not intended that this invention be limited to the hardware or software arrangement or operational procedures shown disclosed. This invention includes all of the alterations and variations thereto as encompassed within the scope of the claims as follows.

What is claimed and desired to be secured by letters patent is:

1. A performance matched radar comprising:
   a circuit for providing a radar output;
   a digital map, coupled to said circuit, for storing calibration data useful for automatically compensating an output of said circuit to accommodate a combination of a variation in elements of said circuit and a variation in an operating condition of said circuit; and
   wherein the radar presents a substantially uniform output display.

2. The radar of claim 1 wherein said circuit further comprises:
   an amplifier section; and
   a device coupled to said amplifier section, for determining a device output performance characteristic.

3. The radar of claim 2, wherein said amplifier section further comprises:
   a sensitivity time coefficient amplifier; and
   a manual gain amplifier.

4. The radar of claim 3, wherein said digital map further comprises:
   a sensitivity map, coupled to said sensitivity time coefficient amplifier, for storing calibration data useful for adjusting a gain of said sensitivity time coefficient amplifier.

5. The radar of claim 3, wherein said digital map further comprises:
   a manual gain map for storing calibration data useful for adjusting a gain of said manual gain amplifier.

6. The radar of claim 1, wherein the radar is a weather radar.

7. The radar of claim 2, wherein said output performance characteristic includes at least one of a color, a display sensitivity, and an output gain.

8. The radar of claim 1, wherein said operating conditions comprises an ambient temperature of the radar.

9. A radar, comprising:
   means for sensing the radar temperature and outputting a temperature signal;
   an amplifier section, the gain of said amplifier section matched to predetermined input power levels and to said sensed temperature, said amplifier section having:
   (i) a sensitivity time coefficient amplifier; and
   (ii) a manual gain amplifier coupled to said sensitivity time coefficient amplifier;
   a digital map, coupled to said temperature signal and to said amplifier section for storing a power/response mapping table of at least one radar output parameter.

10. The radar of claim 9, wherein the radar comprises a weather radar.

11. The radar of claim 9, wherein said digital map further comprises: a sensitivity map coupled to said sensitivity time coefficient amplifier.

12. The radar of claim 9, wherein said digital map further comprises a gain map coupled to said manual gain amplifier.

13. The radar of claim 9, further comprising:
   a detector coupled to said amplifier section;
   a color threshold, coupled to said digital map and to said amplifier section; and
   a comparator for receiving an output of said detector and said color threshold and outputting a radar output signal.

14. The radar of claim 9, wherein said radar output parameter includes at least one of a color threshold, a display sensitivity, and an output gain.

15. The radar of claim 13 wherein said digital map further comprises a color threshold map coupled to said color threshold.

16. A performance matched weather radar receiving an input radar signal and subsequently directing the signal through an amplifier section, comprising:

a radar receiver for receiving a plurality of weather return signals;

means for storing a set of weather return signals as a sensitivity map having a plurality of combinations of receiver sensitivity and gain of the amplifier section;

means for automatically adjusting the amplifier section gain according to said sensitivity map; and means for storing a color threshold map for each of said combinations of said sensitivity map.

17. The radar of claim 16 further comprising:

means for outputting a compensation signal; and a comparator, coupled to receive said compensation signal and to the amplifier section, for outputting a radar output signal.

18. The radar unit of claim 16, further comprising:

means for sensing the temperature of said radar receiver; and wherein said plurality of combinations stored in said sensitivity map further includes sensed temperature.

* * * * *